United States Patent [19]

Kuwayama et al.

[11] Patent Number: 4,517,588
[45] Date of Patent: May 14, 1985

[54] COLOR SOLID STATE IMAGE PICK-UP DEVICE

[75] Inventors: Tetsuro Kuwayama; Nobuyoshi Tanaka; Seiji Hashimoto, all of Kanagawa, Japan

[73] Assignee: Canon Kabushiki Kaisha, Tokyo, Japan

[21] Appl. No.: 402,602

[22] Filed: Jul. 28, 1982

[30] Foreign Application Priority Data

Jul. 31, 1981 [JP] Japan ................................. 56-119175

[51] Int. Cl.³ .............................................. H04N 9/07
[52] U.S. Cl. ................................................... 358/44
[58] Field of Search ......................................... 358/44

[56] References Cited

U.S. PATENT DOCUMENTS 4,245,241  1/1981  Sato et al. ............................ 358/44
4,437,112  3/1984  Tanaka et al. ........................ 358/44

Primary Examiner—Michael A. Masinick
Attorney, Agent, or Firm—Toren, McGeady, Stanger

[57] ABSTRACT

A color solid state image pick-up device in which a color filter array is arranged so as to correspond to each picture element of the solid state image pick-up elements and the output from the solid state image pick-up elements is processed so as to obtain the pseudo-brightness signal, being characterized in that at least one of the brightness signal including a high frequency band component used as the image signal, the brightness signal including a low frequency band component and the brightness signal used as the color difference signal is obtained on the basis of the different output signal from that connected with other brightness signal.

4 Claims, 20 Drawing Figures

FIG. 5
(a)
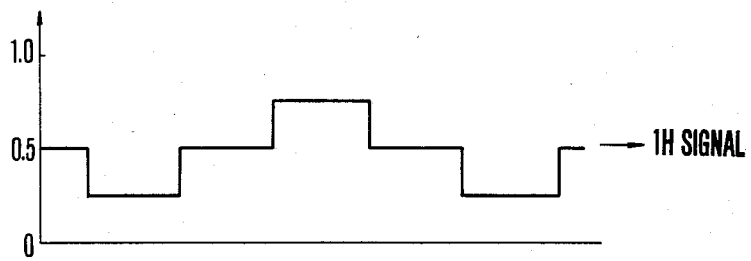
1H SIGNAL
(b)
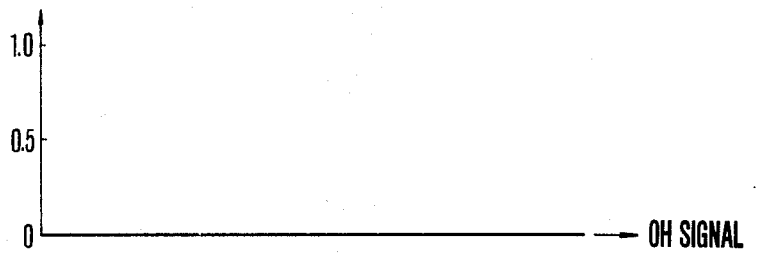
0H SIGNAL
(c)
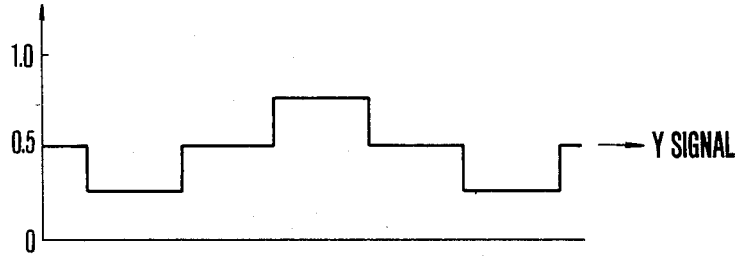
Y SIGNAL
FIG. 6
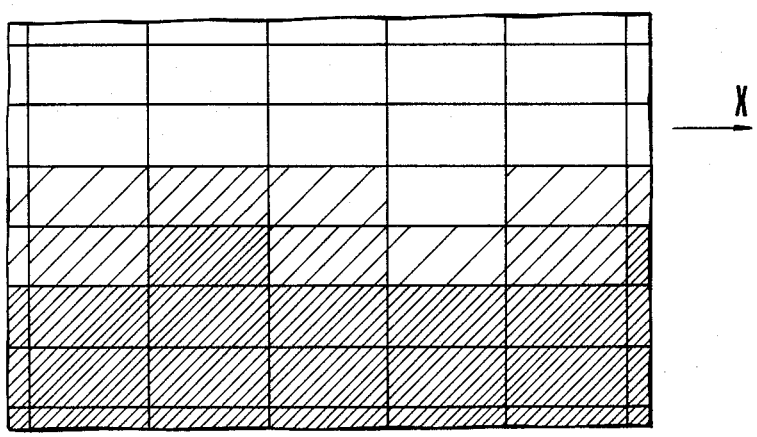

FIG.13(a)

| R | B | Ma | — |
|---|---|---|---|
| G | G | G | G |
| B | R | — | Ma |
| G | G | G | G |

FIG.13(b)

| Ye | W | Cy | G' |
|---|---|---|---|
| G | G | G | G |
| Cy | G' | Ye | W |
| G | G | G | G |

FIG.13(c)

| Ye | W | Cy | G' |
|---|---|---|---|
| W | W | W | W |
| Cy | G' | Ye | W |
| W | W | W | W |

FIG.13(d)

| R | Ma1 | B | Ma2 |
|---|---|---|---|
| G | G | G | G |
| B | Ma2 | R | Ma1 |
| G | G | G | G |

FIG.13(e)

| R | Ma | B | G' |
|---|----|---|----|
| G | G  | G | G  |
| B | G' | R | Ma |
| G | G  | G | G  |

FIG.13(f)

| R | Ma | B | W  |
|---|----|---|----|
| G | G  | G | G  |
| B | W  | R | Ma |
| G | G  | G | G  |

FIG.13(g)

| R | Ma | B | N  |
|---|----|---|----|
| G | G  | G | G  |
| B | N  | R | Ma |
| G | G  | G | G  |

FIG.14

| Ye  | W  | Cy  | G  |      |
|-----|----|-----|----|------|
| Ye' | W' | Cy' | G' | ①→   |
| Cy  | G  | Ye  | W  | ①'→  |
| Cy' | G' | Ye' | W' | ②→   |
| Ye  | W  | Cy  | G  | ②'→  |
| Ye' | W' | Cy' | G' | ③→   |
|     |    |     |    | ③'→  |

COLOR SOLID STATE IMAGE PICK-UP DEVICE

BACKGROUND OF THE INVENTION

1. Field of the Invention

The present invention relates to a color solid state image pick-up device and a combination of color filters for obtaining the color picture signal making use of color image pick-up elements.

2. Description of the Prior Art

As color solid state image pick-up devices, one, two or three imagers of charge carrying image pick-up elements (hereinafter called CCD) are used, and a single imager type camera, a double imager type camera and a triple imager type camera can be thought therefore. However, the present invention particularly relates to the single imager image pick-up device in which one CCD is used.

In the case of the conventional single imager type solid state image pick-up devices in which solid image pick-up elements such as CCD are used, the color filter array is superposed on each image pick-up cell of the image pick-up elements one to one so as to separate the color signals. In the color filter array used in such a single imager type solid state image pick-up device, the red, the green and the blue filter elements are arranged in the shape of mosaic in order to economize the number of the image pick-up cells in CCD. Generally color filters called Bayer arrangement is used.

When the color filters arranged in the shape of mosaic are combined into CCD of the frame transfer type so as to constitute a single imager type color camera, a considerable leakage of signals takes place between the adjacent cells due to its construction, and the colors are mixed, which leads to an insufficient color separation.

Although a method for overcoming the above difficulty has already been proposed by the present inventors (Jap. Pat. Pub. No. Sho 56-115085) and the problem has been largely resolved, the vertical image resolution power is low because the effective range of the sensitivity along the vertical direction is large, while the pseudo-color signals or the contour take place in the image not having a vertical correlation in which the bright and the dark part exist on both sides of a line parallel to the color filter array, so as to lower the quality of the image because it is hereby presumed that a correlation exists along the vertical direction.

SUMMARY OF THE INVENTION

It is accordingly an object of the present invention to provide a color solid state image pick-up device free from the conventional shortcomings, in which the vertical resolution power is increased in combination with the frame transfer type CCD, while the pseudo-color signals and the contour are decreased so as to obtain superior color picture signals.

In accordance with an embodiment of the present invention the output of the CCD combined with a certain determined pattern of color filters is obtained via a low pass filter in order to obtain a high image resolution power of the low band brightness components.

Further, in accordance with another embodiment of the present invention, the brightness signals and the color signals are obtained by making use of the correlation among the three scanning line signals so that the pseudo-color signal at the edge of the object hardly takes place.

In accordance with further another embodiment of the present invention, signals for forming the low band brightness components are obtained from the secondary differentiated signals of the three scanning line signals so that the image resolution power of the low band brightness component is increased. Further, the coefficients of the three scanning lines are adjustable for forming the low band brightness component so that the edge emphasizing effect can optionally be adjusted.

In accordance with further another embodiment, the color difference signals can be adjusted in accordance with the vertical secondary differentiated signals of the CCD output so that the pseudo-color signals at the edge of the object hardly take place.

Other features of the present invention will be apparent from the descriptions to be made below with reference to the accompanying drawings.

BRIEF DESCRIPTION OF THE DRAWINGS

FIGS. 5(a), (b) and (c) respectively show a signal wave form for explaining the growth of the pseudo contour.

FIG. 6 shows a two-dimensional distribution of the brightness of the pseudo-contour.

FIGS. 13(a)–(g) respectively show a color filter arrangement capable of being combined with the first, the second and the third embodiments of the signal processing circuit of the present embodiment.

FIG. 14 shows another embodiment of the color filter arrangement combined with the inter line type CCD of the present embodiment.

DETAILED DESCRIPTION OF THE PREFERRED EMBODIMENTS

Figure 1:
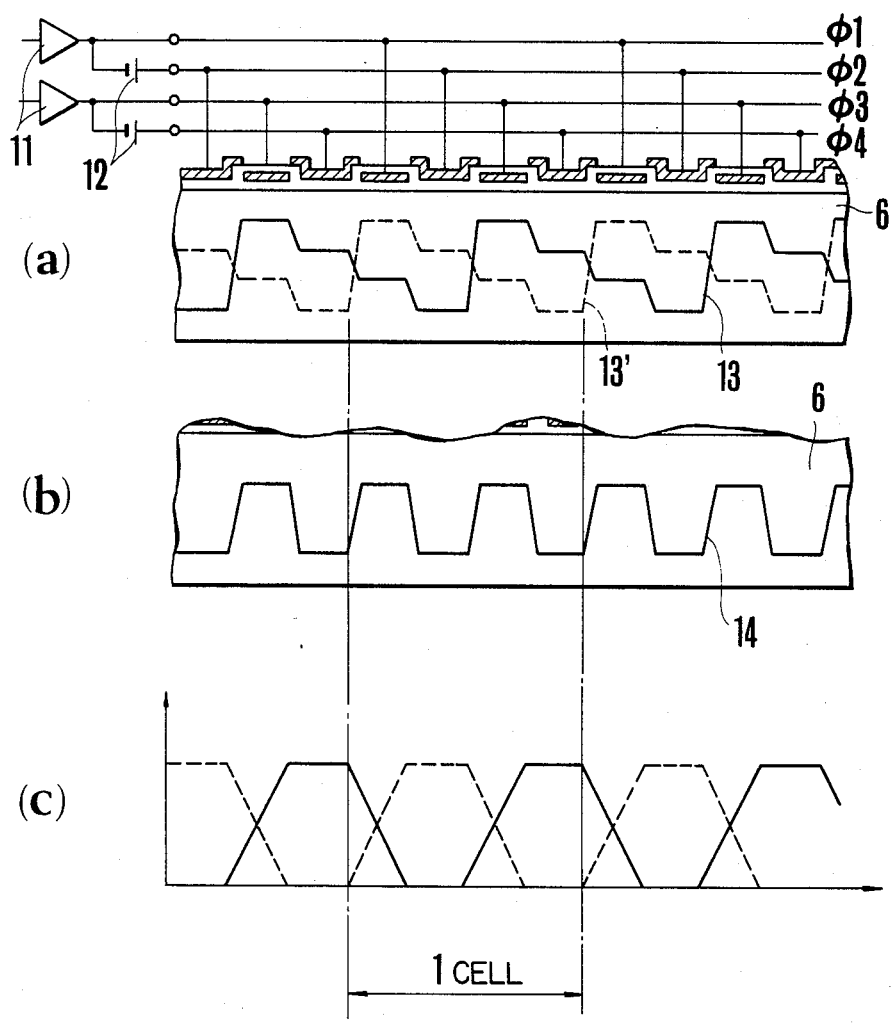
FIGS. 1(a), (b) and (c) are for explaining the structure and the efficiency of the frame transfer type CCD of the present invention.

Below the present invention will be explained in detail in accordance with the accompanying drawings.

When for example each of the electrodes consisting of $\phi 1$, $\phi 2$, $\phi 3$ and $\phi 4$ of the four phase driving type CCD as is shown in FIG. 1(a) is driven, it is possible to form the potential 13 as is shown in the drawing by applying a direct bias voltage 12 to the driver. Namely it is possible to form the bottom of the potential well in a staircase descending toward the carrying direction of charges. The shape 13' of the potential in a dotted line shows the carrying pulse wave form for giving the shape 13 with the phase difference of 180°. Also in case of the two phase driving type CCD as well as the single phase driving type CCD the potential in the form of descending staircases as is shown in FIG. 1(a) is obtained. The present invention can naturally be applied to those types of CCD. However, the four phase driving type CCD will be explained here.

The so far explained shape of potential is the one substantially necessary for carrying charges, whereby it is possible to make the shape of potential as is shown in FIG. 1(b) by applying a proper voltage to the carrying electrodes in the state the charge is stored. The then probability distribution for the charge capture is as is shown in FIG. 1(c).

Figure 2:
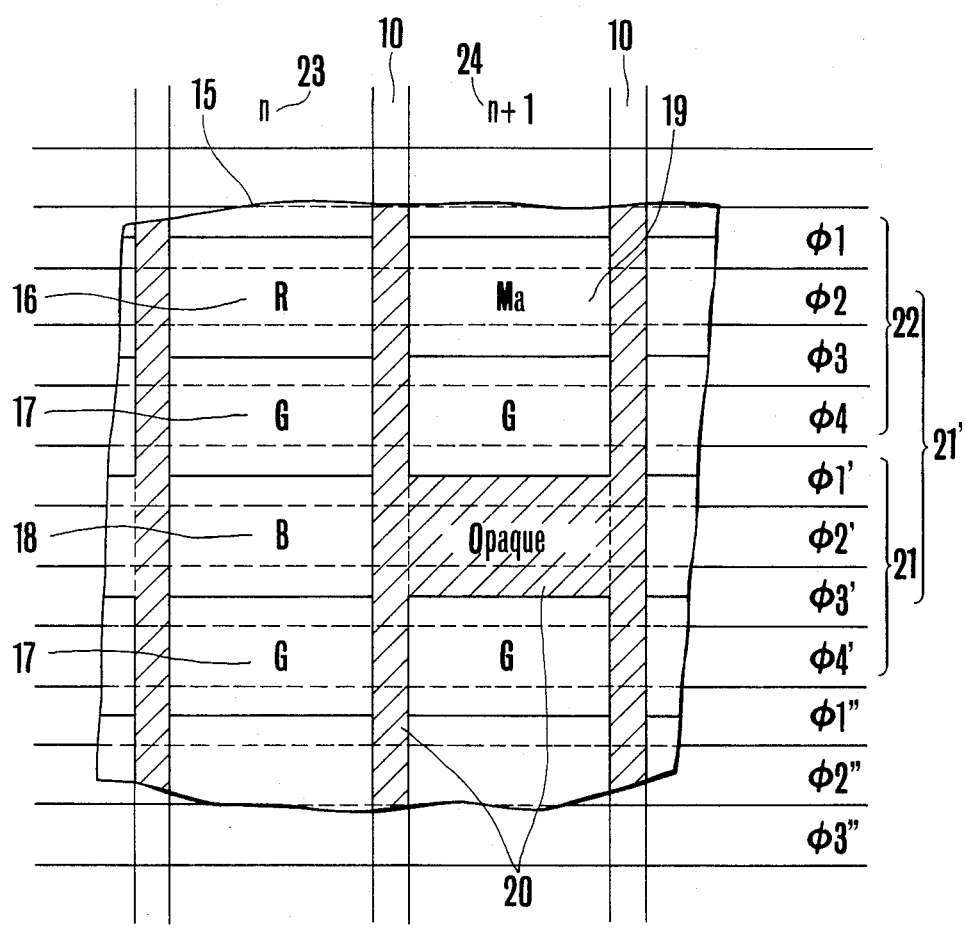
FIGS. 2 and 3 respectively show an arrangement of the color filter array of the present invention.

In this CCD, the color filters 15 of the color arrangement as is shown in FIG. 2 as an example are provided so as to correspond to the respective light sensing element. Hereby, as is shown in the drawing the color filter elements are arranged, being displaced by ½ pitch of one electrode along the vertical direction.

The sets of the filter elements are repeatedly provided along the horizontal and the vertical direction.

16, 17, 18 and 19 in FIG. 2 are respectively the color filter element allowing the passage of the light of the red color R, the green color G, the blue color B and the mazenta color Ma, while 20 is the light shading layer of the non-transparent element Opaque and the channel stopper. As is shown, the color filter is characterized in that a cell consisting of the electrodes $\phi 1$, $\phi 2$, $\phi 3$ and $\phi 4$ is made to correspond to the two different color filter elements.

Although in FIG. 2 $\phi 1$, $\phi 1'$ and $\phi 1''$ are the same electrode, for the sake of the explanation the electrode in the different cell is provided with dash.

When the shape of the potential as is shown in FIG. 1(b) exists in the color image pick-up element, in the potential well under the electrode $\phi 2$ in the line 23 in the n-th column the signal charge obtained by the light sensing element corresponding to the light component having passed through the R color filter element is stored, while at the same time, as is presumed from the charge capture probability distribution in FIG. 1(c) the charge produced by the light components having passed through G above and below the R color filter element 15 is stored, whereby the mixed color components are produced. Now let the charge amount having passed through the respective color filter element 15, stored in the potential well directly under the element 15 and free from the mixed color components be r, g, ma, opaque in small letters and let the coefficient of the mixed color component be $\alpha$. So the charge amount stored in the potential well under the $\phi 2$ electrode in the n-th row is represented $$r' = r + 2\alpha \cdot g \quad (1)$$

In the same way, in the potential well under the $\phi 4$ electrode in the n-th row the charge amount $$g' = \alpha \cdot r + g + \alpha \cdot b \quad (2)$$

is stored.

In the potential well under the $\phi 2'$ electrode in the n-th row the charge amount $$b' = 2\alpha \cdot g + b \quad (3)$$

is stored.

In the potential well under the $\phi 4'$ electrode in the n-th row the charge amount $$g' = \alpha \cdot r + g + \alpha \cdot b \quad (4)$$

is stored.

In the potential well under the $\phi 2$ electrode in the line 24 in the n-th row the charge amount $$ma' = ma + 2\alpha \cdot g \quad (5)$$

is stored.

In the potential well under the $\phi 4$ electrode in the n+1th row the charge amount $$g' = \alpha \cdot ma + g \quad (6)$$

is stored.

In the potential well under the $\phi 2'$ electrode in the n+1th row the charge amount $$opaque = 2\alpha \cdot g \quad (7)$$

is stored.

In the potential well under the $\phi 4'$ electrode in the n+1th row the charge amount $$g' = \alpha \cdot ma + g \quad (8)$$

is stored.

So far, the charge amount stored in the potential well under the respective electrode in the store mode is shown. When the store mode is changed over into the carrying mode in which the signal flows out, the shape of the potential in FIG. 1(b) is changed into the one of the descending staircases at 13' in FIG. 1(a) by changing the carrying pulse voltage to be applied to the respective electrode. At this time the charge r' stored in the potential well under the $\phi 2$ electrode in the n-th row is added to the charge g' stored in the potential well under the $\phi 4$ electrode in the n-th row and stored in a potential well newly formed under the $\phi 4$ electrode. Further, the electrode ma' stored in the potential well under the $\phi 2$ electrode in the n+1th row is added to the charge g' stored in the potential well under the $\phi 4$ electrode in the n+1th row and stored in the potential well under the $\phi 4$ electrode.

Figure 3:
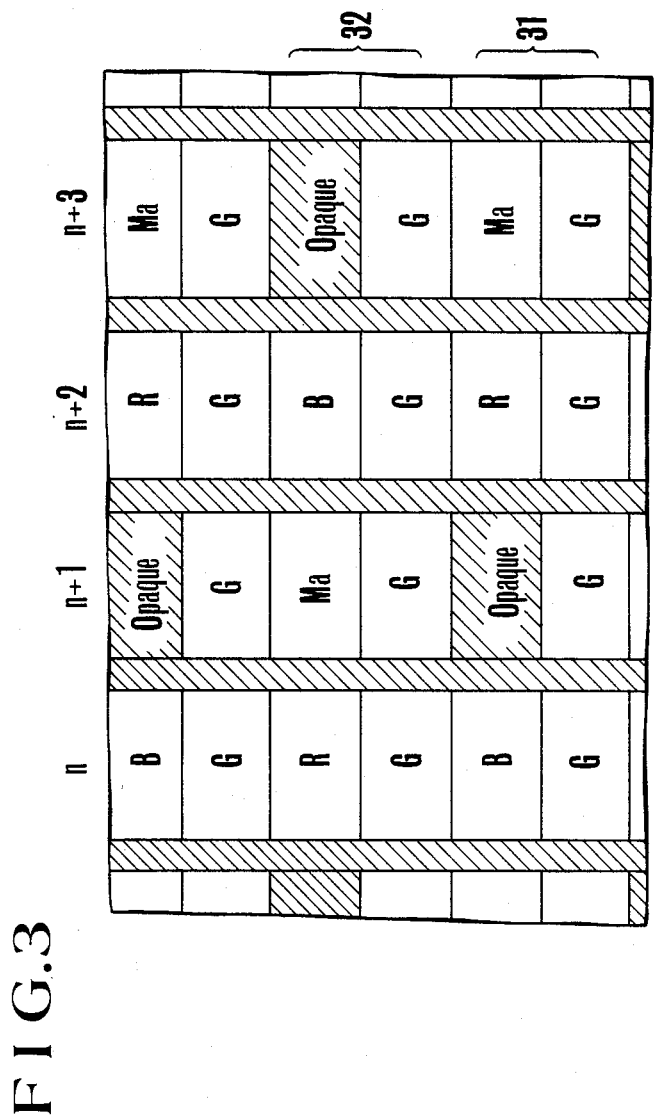

FIG. 3 shows an example of the repeated arrangement of the color filters to be combined with the color solid image pick-up element shown in FIG. 2. A R(red) color filter element, a Ma(magenta) color filter element, a B(blue) color filter element and an Opaque color filter element are repeated along the right direction, while G(green) color filter elements are arranged on a straight line vertically.

When the color filter array is arranged as is shown in FIG. 3, (b'+g'), (opaque'+g'), (r'+g') and (ma'+g') are repeatedly read out from the vertical line 21 consisting of the $\phi 1'$, $\phi 2'$, $\phi 3'$ and $\phi 4'$ electrode in FIG. 2.

Consequently, the then output signal corresponds to the color lights having passed through the filters in the range shown with 31 in FIG. 3. In the same way (r'+g'), (ma'+g'), (b'+g') and (opaque'+g') are repeatedly read out from the vertical line 22 consisting of the $\phi 1$, $\phi 2$, $\phi 3$ and $\phi 4$ electrode so as to correspond to the range of the color filter shown with 32 in FIG. 3.

At the time of the interlace operation the carrying pulse voltage is changed so as to assume the shape of the potential shown with 13 in FIG. 1, (g'+b'), (g'+opaque'), (g'+r'), (g'+ma') are repeatedly read out from the vertical line consisting of the $\phi 3$, $\phi 4$, $\phi 1'$ and $\phi 2'$ electrode so as to correspond to the range of the filter shown with 31 in FIG. 3.

Figure 4:
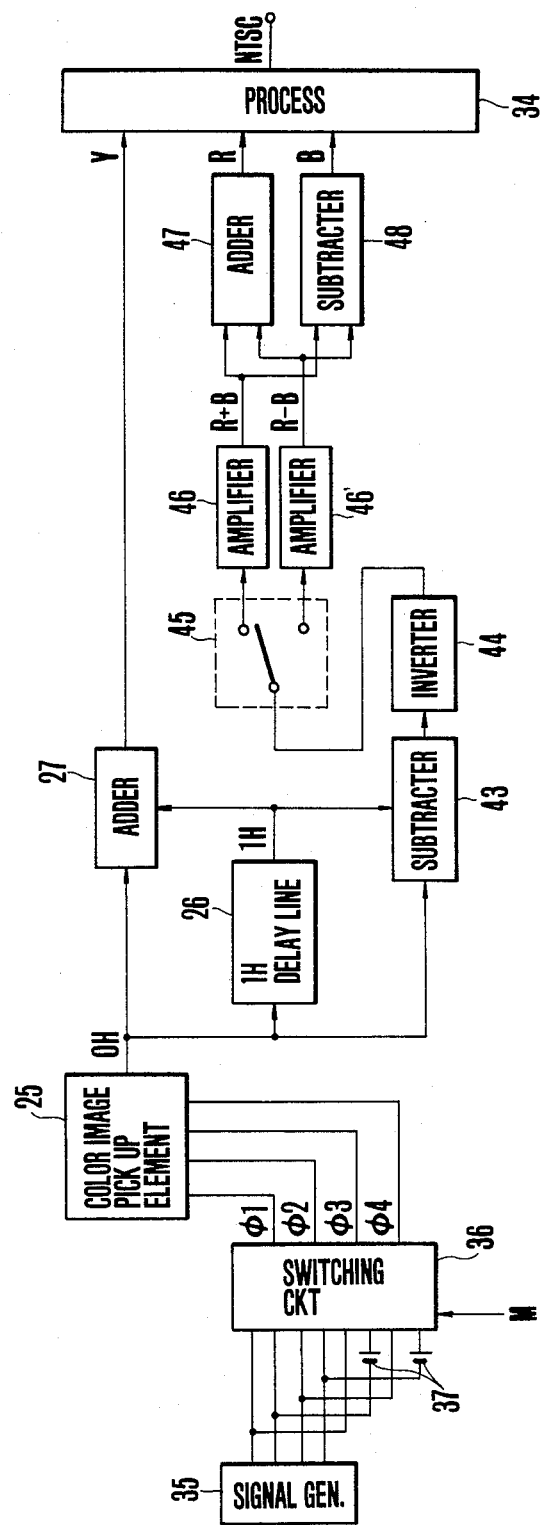
FIG. 4 shows a block diagram of an example of the signal processing circuit for the CCD in FIG. 1.

FIG. 4 shows an example of the control block for obtaining a color signal from the thus read out output signal from the color image pick-up element.

In the drawing 35 is the signal generator for producing the electrode driving signals $\phi1$-$\phi4$.

36 is the switch circuit, which changes over the driving signals $\phi1$-$\phi4$ of the signal generator 35 and the driving signals biased with direct voltage 37 between the carrying mode and the store mode and apply them to the color image pick-up element 25. The output of the switch circuit 36 changes with the applied mode signal M.

26 is the delay line, which delays the signal for one horizontal scanning period so as to obtain the brightness signal Y, the red signal R and the blue signal B by making use of the correlation along the vertical direction. 25 corresponds to the color solid image pick-up element in FIG. 2, whereby the mosaic shaped color filters are combined with CCD. The output signal from the color image pick-up element 25 is led to the input terminal of the adder 27, the delay line 26 and the subtracter 43.

The signal obtained from the adder 27 is obtained from the equations (1)-(4) for the n-th row. When now the signal levels corresponding to the respective charge amount are written in large letters, the signal is $$(R'+G')+(B'+G')=(1+2\alpha)(R+2G+B)$$

while for the n+1th row from the equations (5)-(8)

$$(Ma'+G')+(Opaque'+G')=(1+2\alpha)(Ma+2G)$$

The above can be used as the brightness signal because $Ma=R+B$.

Further, also for the (n+2)th row and the (n+3)th row the obtained signals are $$(B'+G')+(R'+G')=(1+2\alpha)(R+2G+B)$$

$$(Opaque'+G')+(Ma'+G')=(1+2\alpha)(Ma+2G)$$

and can be used as the brightness signal Y in the same way.

From the above result it can be understood that the influence of the mixed color is not a big problem because it is the brightness signal (R+2G+B) simply multiplied with the coefficient $(1+2\alpha)$. Further, because the brightness signal is obtained for each clock a sufficient resolution power can be obtained with a comparatively small number of CCD as the number of picture elements along the horizontal direction.

On the other hand the output signal of the substracter is $$(R'+G')-(B'+G')=(R-B)$$

for the n-th row, $$(Ma'+G')-(Opaque'+G')=Ma=(R+B)$$

for the n+1th row, $$(B'+G')-(R'+G')=B-R=-(R-B)$$

for the n+2th row, $$(Opaque'+G')-(Ma'+G')=-Ma=-(R+B)$$

for the n+3th row.

The above signals are inverted with the invertor 44 in such a manner that the signals (R−B), (R+B), (R−B), (R+B) are repeated. The then mixed color components are all compensated with the subtraction process so that the obtained signals are completely free from the mixed color components.

The signals (R+B), (R−B) which can be obtained repeatedly as mentioned above are repeated in the separating circuit 45 as a sample hold circuit and adjusted into (R+B), (R−B) with normal magnitude with the amplifiers 46, 46' for adjusting the output level. These signals are added with the adder 46 into the R signal and subtracted with the subtracter 48 into the B signal.

The signals Y, R, B are delivered to the processer consisting of a low pass filter, a gamma compensating circuit, a matrix circuit and a color encoder circuit, whereby the processor 34 delivers the NTSC color signal.

As mentioned above in accordance with the present invention the frame carrying type CCD is combined with the mosaic filter so as to obtain the color picture signal free from the mixed colors, whereby the abovementioned embodiment has the following shortcomings.

The first shortcoming is the low resolution power along the vertical direction. Because as explained above the signal (1H signal) delayed by one horizontal scanning time and the non-delayed signal (0H signal) are added so as to obtain the brightness signal Y the effective range of the sensitivity along the vertical direction covers the four color filter adjacent along the vertical direction. This corresponds to four scanning lines out of 525 lines including the interlace operation on the final TV picture plane. As the resolution power along the vertical direction for the home color camera a range of the sensitivity of two scanning lines is sufficient, while the resolution power of the present system along the vertical direction is insufficient in comparison with the normal system.

The second shortcoming is the saw tooth shaped false contour for the picture with small vertical correlation having a heavy change of the brightness distribution of the object along the vertical direction. Now let us suppose that the lower part (the upper part in TV picture plane) in FIG. 3 the range up to 31 corresponds to the bright part of the picture, while the upper part above the range 32 corresponds to the dark part of the picture. The 1H signal (FIG. 5(a)) obtained from the range 31, the 0H signal (FIG. 5(b)) obtained from the range 32 and the brightness signal Y (FIG. 5(c)) obtained as the sum of the above both are as is shown in FIG. 5. Namely, the input picture has an even structure along the horizontal direction, while the obtained brightness signal Y has a fluctuation. As the result the figure observed on the TV picture plane is as is shown in FIG. 6. Namely, the object with an even structure along the horizontal direction has a bright and a dark structure on the TV plane.

Further, in FIG. 6 the brightness is indicated with the number of the oblique lines for the sake of representation. Further, the arrow X shows the scanning direction.

Figure 7:
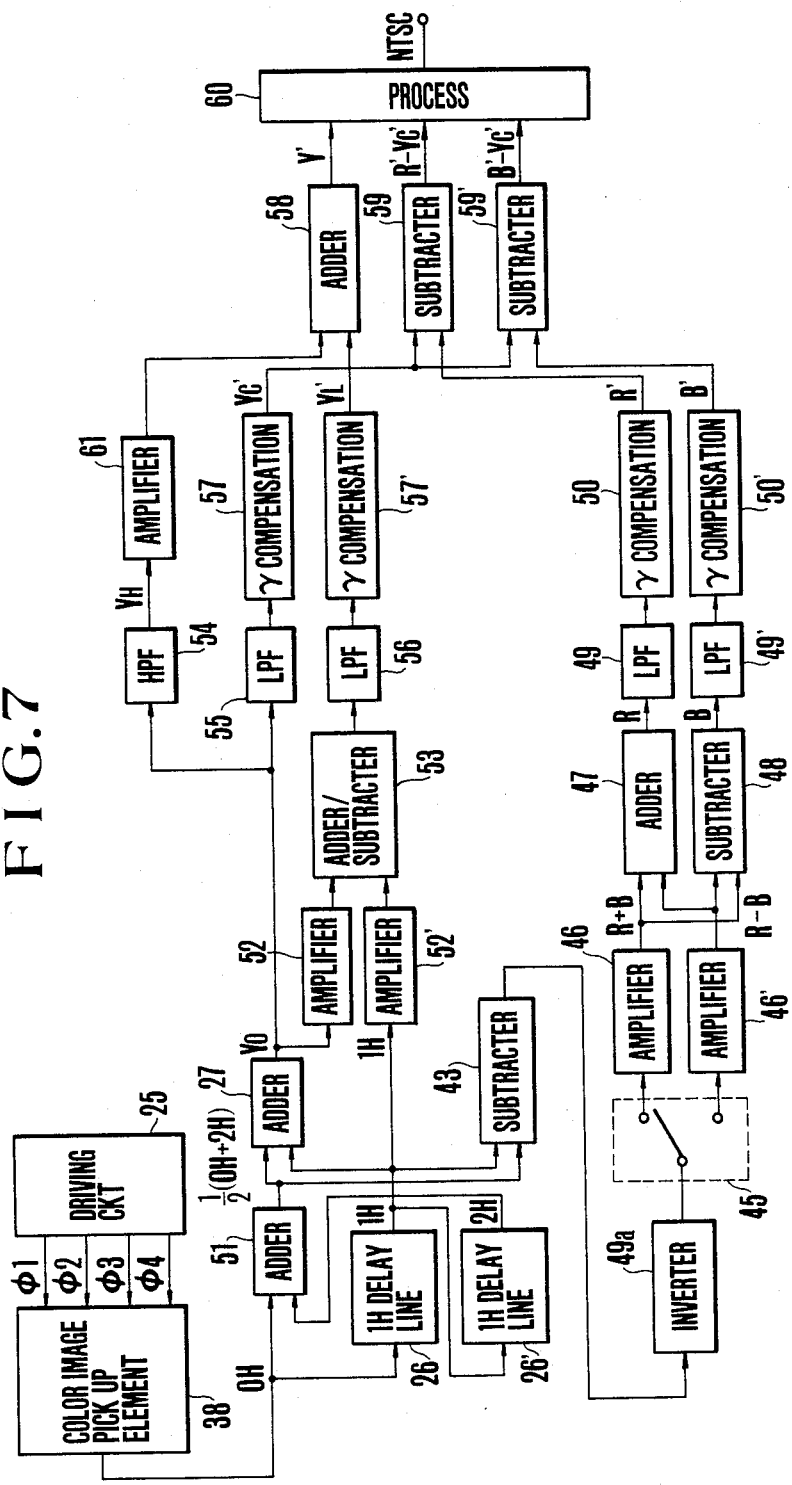
FIGS. 7, 8 and 9 respectively show a block diagram of the first, the second and the third embodiments of the signal processing circuit.

FIG. 7 shows an embodiment free from such shortcomings. In the drawing the color solid image pick-up element 25 constructed as is shown in FIGS. 2 and 3 is driven with the driving circuit 38 producing for example $\phi1$, $\phi2$, $\phi3$ and $\phi4$. Further, in case of the present embodiment the output signal (0H signal) from the color solid image pick-up element 25 is input in the delay line 26 for delaying the signal by one horizontal scanning time so as to obtain 1H signal and further delayed in the delay line 26' into 2H signal. From the 2H signal and the 0H signal the mean value ½(0H+2H) is obtained with the adder 51. Further, the adder 27 is characterized in that 1H signal and ½(0H+2H) signal are added into the pseudo-brightness signal Yo. In this way, the false color signal to be explained later is hardly produced.

Further, the signal Yo is varied into $$Yo = \tfrac{1}{2}(0H+2H)+1H = \tfrac{1}{2}(2H+1H)+\tfrac{1}{2}(1H+0H),$$

which can be considered as the mean value of the pseudo-brightness signal and the signal before 1H.

On the other hand the difference between 1H signal and ½(0H+2H) is obtained in the subtracter, which is the repetition of (R−B), (R+B), −(R−B), −(R+B) . . . . After the sign of the signals are inverted in the inverter 49a, the signals are separated in the separating circuit such as a sample hold circuit into (R+B) and (R−B). The signals (R+B), (R−B) are amplified up to the normal signal level with the amplifier 46, 46'. Further, because the R signal and the B signal used comparatively low frequency component as compared with the brightness signal Y, it is sufficient for the amplifiers 46, 46' to have a comparatively narrow frequency band, and those having a proper low pass filter or a sample hold circuit can be used.

The signals (R+B), (R−B) is converted into the R signal with the adder 47 and further into the R' signal with the low pass filter 49 and the gamma compensating circuit 50. Hereby, it is sufficient for the R' signal to have a band of abt. 0.5 MHz in case it is used as the NTSC signal.

From the subtracter 48 the B signal is obtained and converted into the B' signal with the low pass filter circuit 49' and the gamma compensating circuit 50'.

Below the method for forming various kinds of the brightness signals in accordance with the present invention in order to obtain color difference signals by combining the R' signal with the B' signals will be explained.

The color solid image pick-up element of the present invention is characterized to obtain a pseudo-brightness signal by summing the four signal outputs continuous along the horizontal direction. Namely, from the results of the equations (1)-(8), $$(B' + G') + (Opaque' + G') + (R' + G') + (Ma' + G') = \\ (2\alpha G + B + \alpha R + G + \alpha B) + \\ (2\alpha G + \alpha Ma + G) + \\ (R + 2\alpha G + \alpha R + G + \alpha B) + \\ (Ma + 2\alpha G + \alpha Ma + G) = \\ (2 + 4\alpha)(R + 2G + B)$$

can be calculated. Namely, the output from the color solid image pick-up element can be used as the pseudo-brightness signal via a proper low pass filter circuit.

For Example in accordance with the present invention the brightness signal YC' of the present invention for obtaining the color difference signal by combining the R' signal with the B' signal is obtained by making the Yo signal as the sum of ½(0H+2H) signal and 1H signal pass through the low pass filter circuit 55 and the gamma compensation circuit 57'. The difference among the YC' signal, the R' signal and the B' signal are obtained with the subtracters 59 and 59', namely the color difference signals (R'−YC') (B'−YC') are obtained and input into the process circuit 60.

Thus, no false color takes place at the upper and the lower edge of the white and black body. In accordance with the present invention the vertical sensitivity range of the R' and the B' color signals used for calculating the color difference signals (R'−YC'), (B'−YC') is same as that of the brightness signal YC' and further there is no positional difference along the vertical direction so that for the colorless body such as the white and black body the values of the color differences (R'−YC'), (B'−YC') are zero and therefore there takes place no color. Further, although for the bright part of the edge image of the colored body the magnitude of the color difference signals (R'−YC'), (B'−YC') is small as compared with the brightness signal Y', that is, the bright part is almost colorless and the false color signal is hardly recognized.

Further, in case of the embodiment in FIG. 7 the 1H signal and the Yo signal are respectively amplified with the amplifier 52 and 52' up to a proper magnitude and added or subtracted in the adder/substracter 53 so as to obtain the brightness signal YL' via the low pass filter 56 and the gamma compensating circuit 57'. Consequently, by properly selecting the amplification factor of the amplifiers 52, 52' and applying the adder/subtracter 53 it is possible to adjust the vertical resolution power to a considerable extent.

Further, by subtracting the signal adjusted up to a proper magnitude with the amplifier 52 it is possible to emphasize the edge along the horizontal and the vertical direction in an easy way.

Further, if the output of the amplifier 52 is not cut or the amplifier 52 and the adder/subtracter 53 are not used the vertical sensitivity range corresponds to that in which the 1H signal is read out, namely 2 scanning line, so that the effective vertical sensitivity range is narrow and the image resolution power can easily be improved.

On the other hand in case of an embodiment of the present invention the high band brightness component YH is taken out from the Yo signal corresponding to ½(0H)+1H+½(2H), amplified with the amplifier 61 and then added to the low band signal YL' in the adder 58 so as to obtain the brightness signal Y' to be input in the process circuit 60.

Consequently, the high band component YH of the brightness signal is separated so that it is possible to adjust the degree for emphasizing the horizontal and the vertical edges freely by changing the amplifying factor of the amplifier 61 and the characteristics of the high pass filter 54.

Further, as compared with the embodiment in FIG. 4 the vertical raw tooth shaped contour of the image becomes hard to take place.

Namely in accordance with the present invention a mean value of the high band component of the Y signal in a wide vertical range is taken the modulation amplitude of the signal in FIG. 5 is decreased down to the half.

Figure 8:
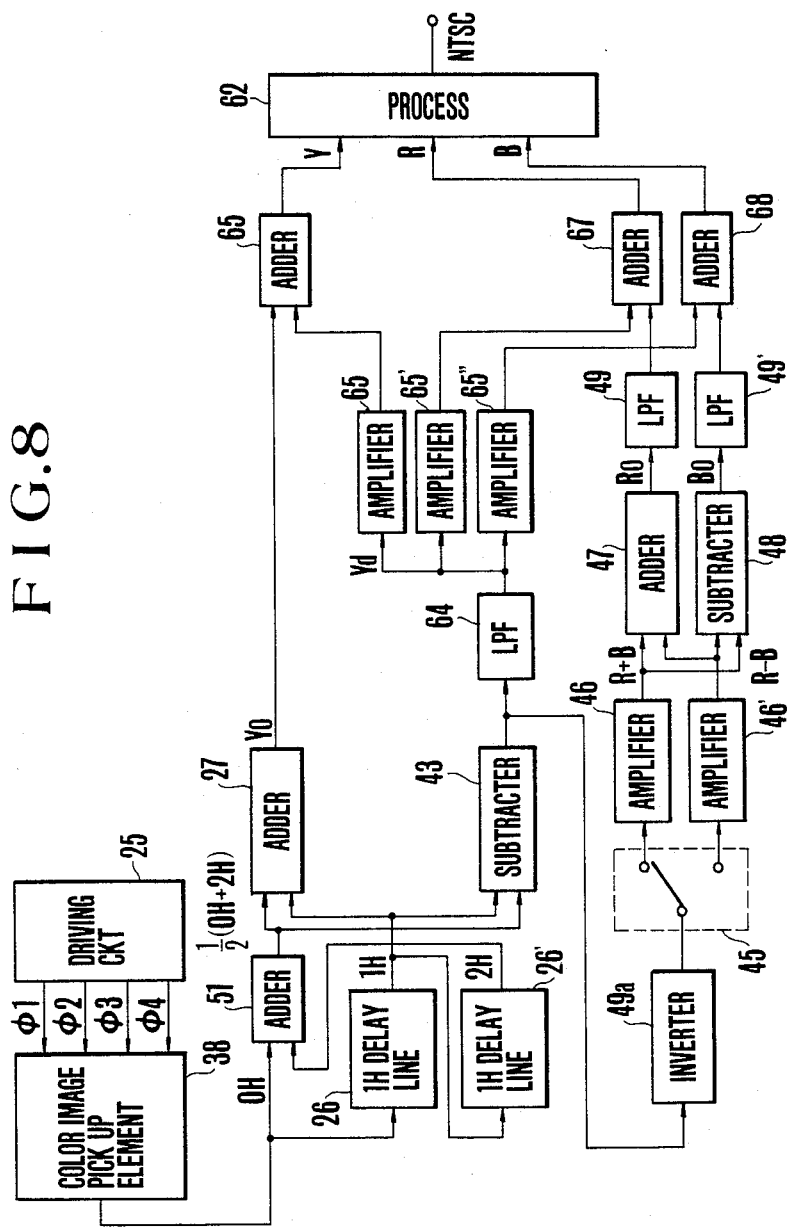

The second embodiment of the signal processing circuit of the present invention is shown in FIG. 8. In the drawing the same member having the same figures in FIG. 7 are the same members.

In case of the present embodiment by making the low band component of the brightness signal the vertical secondary differentiated signal obtained from 0H, 1H and 2H signals, the contour of the low band brightness component is emphasized. Further, the contour for the color signals is also emphasized.

In the same way as in case of the preceding embodiment, the output $-\frac{1}{2}(0H)+(1H)-\frac{1}{2}(2H)$ is obtained from the subtracter 43 so as to obtain the color signal Ro via the inverter 49a, the separating circuit 45, the amplifiers 46, 46' and the adder 47, while from the subtracter 48 the color signal Bo is obtained. On the other hand in case of the present embodiment the output from the subtracter 43 is passed through the low pass filter 64 so as to obtain the vertical secondary differentiated signal Yd of the input image. Then, the signal is added to the output brightness signal Yo of the adder 27 in the adder 68 so as to obtain the brightness signal Y. Further, the color signals Ro, Bo are passed through the low pass filter 49, 49' and then added to the Yd signal in the adders 67, 68 into the R, the B signal.

The Y, the R, and the B signals obtained in this way are input in the process circuit 62 consisting of the matrix circuit, the gamma compensating circuit and so on so as to be converted into the NTSC signal. Hereby the processing circuit 62 may be either the one which obtains the NTSC signal from the Y', the (R'−Y') and the (B'−Y') signal as is shown in FIG. 7 or the one which obtains the NTSC signal from the Y, the R and the B signals from which the G signal is obtained with the matrix circuit and then submitted to the normal gamma compensation. Due to the above construction in case of the present embodiment the image resolution power of the brightness signal in the low band component is improved, while for the color signals the false color signals of the edge becomes hard to take place.

The third embodiment of the present invention will be explained in connection with the block diagram in FIG. 9. In the drawing the members having the same figures as those in FIG. 7 are the same members. The present embodiment is particularly intended to prevent the color spreading for the highly colored body along the vertical direction.

With almost the same circuit as is shown in FIG. 7, the color signals (R'−YC'), (B'−YC') are obtained as the output of the subtracters 59, 59'. On the other hand, the output from the subtracter 43 is made into the vertical secondary signal Yd via the low pass filter circuit 64 and input in the limitter circuit 69. The amplifiers 70, 70', which receive the output of a proper amount from the limiter circuit 69, decrease the magnitude of the color signal (R'−YC'), (B'−YC') and at times down to zero. As the result, not only for the colorless body but also the highly red body the color spreading at the upper and the lower edge can be prevented. Hereby, it is sufficient for the limiter circuit used here to limit the output of the amplifiers 70 and 70' when the Yd signal is of a negative value or the absolute value of the Yd signal surpasses a certain determined level.

The effect of the third embodiment of the present invention in FIG. 9 will be explained in connection with FIGS. 10–12.

Figure 10:
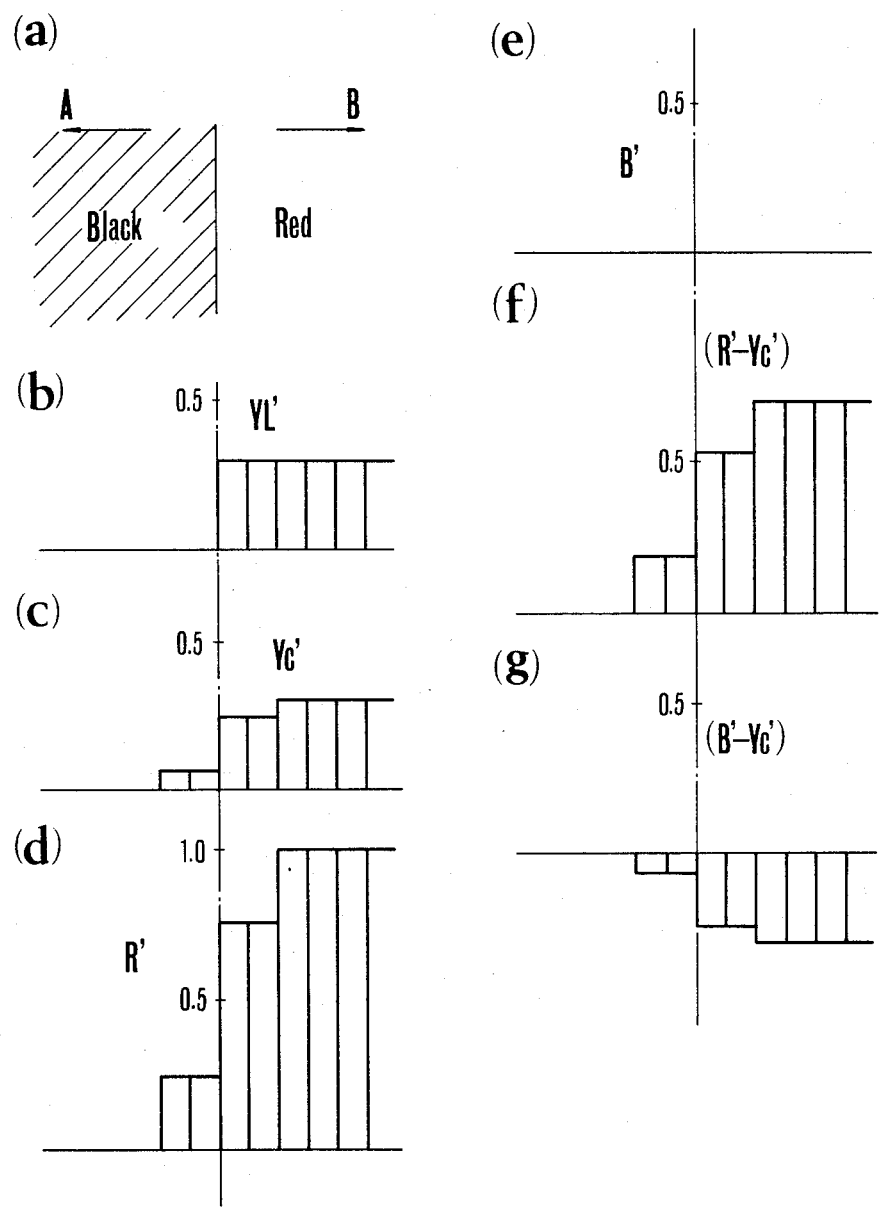
FIGS. 10(a)–(g) and FIGS. 11(a)–(c) respectively show a signal output obtained with the first embodiment of the present invention.

FIG. 10(a) shows the input image with the black and the red edge. For the sake of the explanation the left side (A) corresponds to the upper side of the picture, while the right side (B) corresponds to the lower side of the picture. FIG. 10 (b) shows the distribution of the YL' which has an acute rising up because the upper and the lower image resolution power is high. FIG. 10 (c) and FIG. 10 (d) respectively show the rising up of the Yc' and the R' signal. Because the vertical image resolution power is low there are two scanning lines for producing the output corresponding to $\frac{1}{4}$ and $\frac{3}{4}$ for the saturated output.

The output of the B' signal in FIG. 10 (e) is zero because the input image has no B component.

From the difference among the Yc' signal in FIG. 10 (c), the R' signal in FIG. 10 (d) and the B' signal in FIG. 10 (e), the signals (R'−Yc'), (B'−Yc') in FIG. 10 (f) can be obtained. Although in order to make the explanation simple the influence of the gamma compensation is omitted in the above analysis, almost same discussion can be made even if the gamma compensation is taken into consideration.

Figure 11:
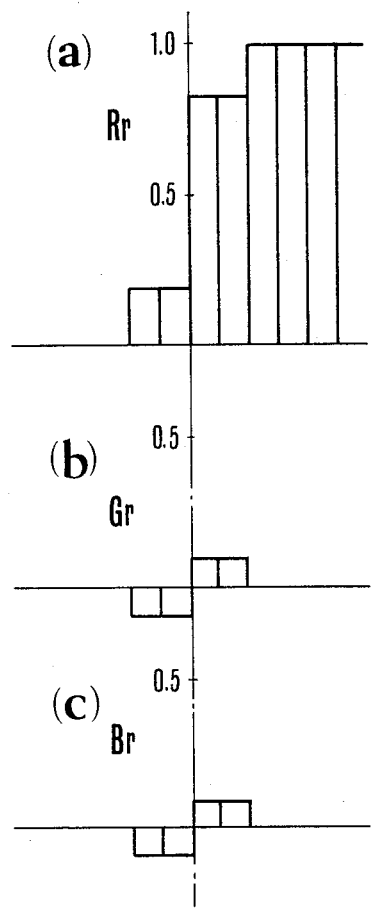

FIG. 11 shows the light amount Rr, Gr, and Br of the red, the green and the blue in the image receiving device as in case of the first embodiment of the present invention in FIG. 7, in which the output of the amplifiers 70, 70' are not limited by the output of the low pass filter 64.

In case of the ideal image pick-up the light amount Rr of the red rises up rapidly, while there exist no light amount Gr, Br of the green and the blue at all. However, as is clear from the drawing in this case the Rr of the red exists where it is necessary to be black, while the Gr and Br of the green and the blue appear at the edges. Hereby, the green light and the blue light at the edges do not influence the image so much, while the red light in the dark position decreases the vertical image resolution power to a considerable extent. Hereby, the negative part of the Gr and the Br in the drawing are not displayed in the image receiving device.

Figure 9:
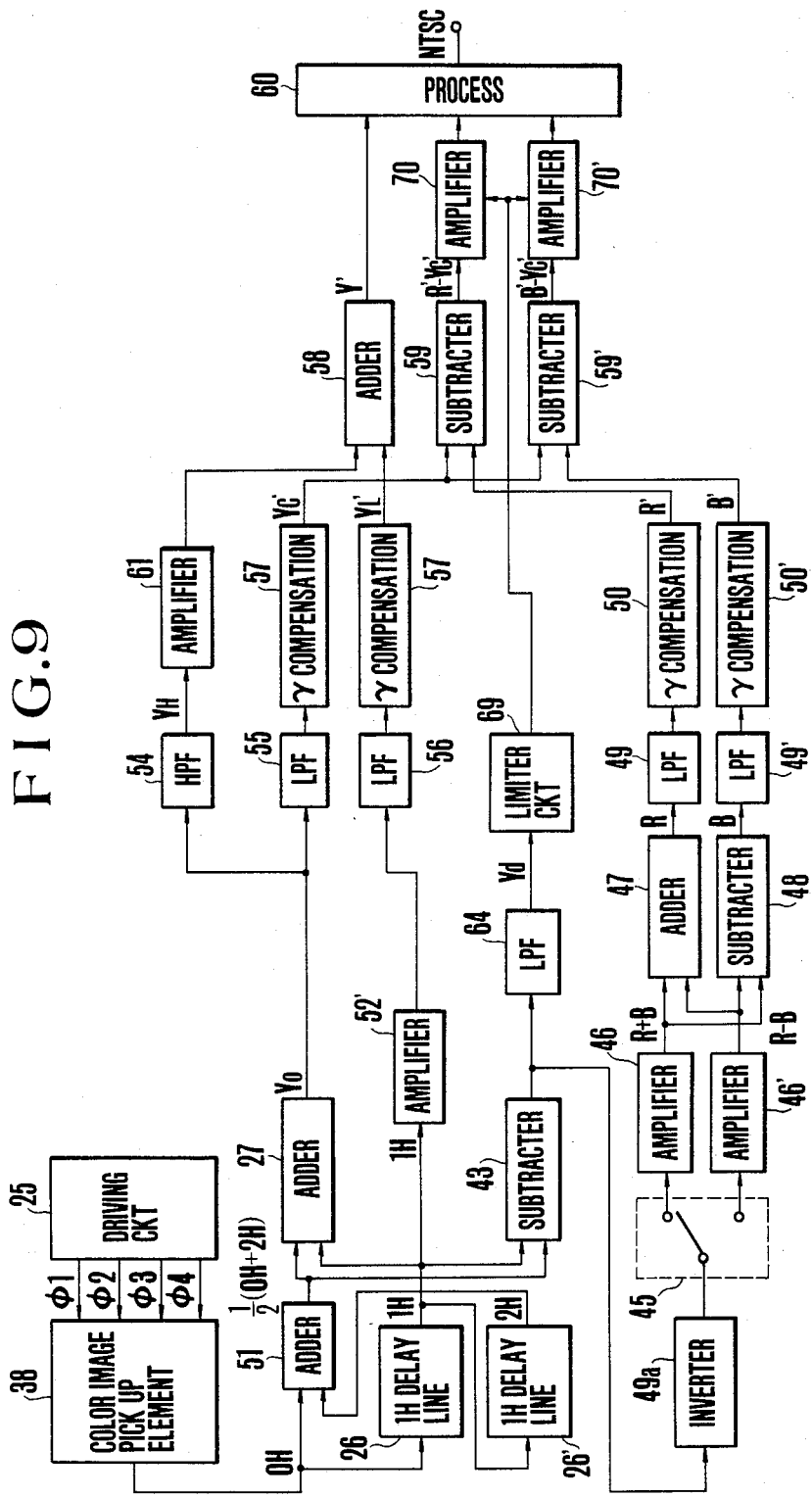
Figure 12:
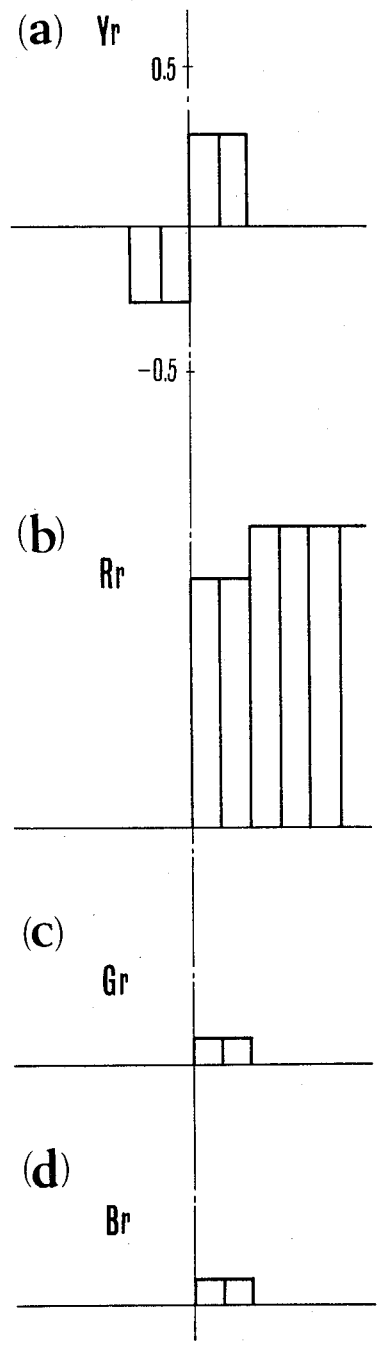
FIGS. 12(a)–(d) respectively show a signal wave form of the improved signal output obtained with the signal processing circuit in FIG. 9.

FIG. 12 shows a result of the third embodiment of the present invention in FIG. 9, where the color difference signals are limited in accordance with the output of the low pass filter 64. The vertical secondary differenciated signal Yd of the brightness signal has a positive and a negative value in the neighborhood of the edges as is indicated in FIG. 12 (a). Now let us suppose that in case the value of the Yd is negative the amplification factor of the color difference signals (R'−Yc'), (B'−Yc') is small or zero. When the value of the color difference signal is zero the red light spreading in FIG. 11 (a) disappears as is shown in FIG. 12 (b), while the negative part of the Gr and the Br also disappears as is shown in FIGS. 12 (c) and 12 (d).

As explained above it is possible to prevent the vertical color spreading by decreasing the amount of the color difference signal in the part in which the brightness changes largely along the vertical direction, which is quite effective for improving the synthetic picture quality.

FIG. 3 shows an example of the arrangement of the color filters used in the present invention. As the conditions necessary for the color filters of the present invention, any one which satisfies the following two will do:

(1) a signal is added to the signal delayed by one horizontal period so as to obtain a pseudo-brightness signal.

(2) more than two continuous outputs are added so as to obtain a pseudo-brightness signal.

FIGS. 13 (a)–(g) respectively show an example of the arrangements of the color filters to be used in the present invention. FIG. 13 (a) shows the arrangement of the color filter in FIG. 3, whereby a part is altered. FIG. 13 (b), (c), shows the arrangement of the color filter in FIG. 3, whereby a part is made complementary color filter so as to improve the sensitivity. In the drawing, Ye is the yellow filter, G the green filter with a different permeability, Cy the cyanic filter and W the transparent filter. FIG. 13 (d) shows the arrangement of the color filter in FIG. 3, whereby a small window is provided in the light shading part and arranged with the mazenta filter Ma2 so as to decrease the false contour. FIGS. 13 (e) and (f) respectively show an arrangement of the filters in which a small window is provided with the green filter G' and the transparent filter W. Further, in FIG. 13 (g), instead of providing the light shading part with a small window a grey filter having a relatively low permeability or a filter N having a polarization permeability for giving a green brightness signal is provided.

In the above explanation for the solid image pickup element the four phase, the two phase and the one phase driven from transfer type CCD is taken up as the example. However, it would be clear that the circuit and the filter arrangement mentioned above can be practiced also in case the interline transfer type CCD is driven in the field storage mode. In this case each of the color filters corresponds to the light recording element one to one, while at the time of reading out the output of the vertically adjacent light sensing element are added so that the almost similar treatment is possible and the almost similar effect can be obtained with the present invention.

Further, the present invention can also be applied in case the interline transfer type CCD is used in the frame storage mode. FIG. 14 shows an embodiment of the arrangement of the color filters in this case. In the field with odd numbers the outputs corresponding to the filters Ye, W, Cy and G are obtained in sequence from the first scanning line, the output corresponding to Cy, G. Ye and W from the second scanning line and the outputs corresponding to Ye, W. Cy and G from the third scanning line. These outputs satisfy the conditions of the present invention and the signal processing circuits of the present invention in FIGS. 7, 8 and 9 can be used without modification.

So far the embodiments of the present invention are explained in the case the four phase, the two phase or the one phase driven frame transfer type CCD and the interline transfer type CCD are used in the field storage mode and in the case the interline transfer type CCD is used in the frame storage mode, whereby so far as the output obtained from the solid image pick-up element satisfies the principle of the present invention it can be applied in any case. Further, as the high band component and the low band component in the brightness signal are explained as the pseudo-brightness signal, it is not always necessary that the polarization sensitivity characteristics correspond to the shape of the brightness signal strictly, whereby the high band components may be different from the low band components in the shape of the polarization characteristics.

What we claim:

1. A color solid state image pick-up apparatus, comprising:
   (a) a solid state image pick-up device for transducing an optical picture image into an electrical signal, said pick-up device having a plurality of rows;
   (b) filter means in an incident light path to the solid state image pick-up device for imparting different spectral characteristics to light incident on a portion of the solid state image pick-up device;
   (c) operation means for forming a signal corresponding to a brightness by adding output signals from a plurality of rows of the solid state image pick-up device with a predetermined ratio;
   (d) low-frequency selecting means for selecting and emitting a low-frequency component of the output signal from a predetermined row of the solid state image pick-up device; and
   (e) mixing means for mixing the output of the operation means with the output of the low-frequency selecting means.

2. A device according to claim 1, in which the filter means is composed of plurality of portions having different spectral characteristics arranged in a mosaic pattern.

3. A color solid state image pick-up apparatus comprising:
   (a) a solid state image pick-up device for transducing an optical picture image into an electrical signal, said pick-up device having a plurality of rows;
   (b) filter means in an incident light path to the solid state image pick-up device, for imparting different spectral characteristics to light incident on a portion of the solid state image pick-up device;
   (c) subtracting means for forming a color signal by subtracting output signals from a plurality of the rows of the solid state image pick-up device;
   (d) adding means for forming a signal corresponding to a brightness by adding output signals from a plurality of the rows of the solid state image pick-up device; and
   (e) color difference signal forming means for forming a color difference signal by subtracting the low-frequency components of the output of the adding means and the color signal.

4. A color solid state image pick-up device, comprising:
   (a) means for forming a signal charge said means forming a plurality of independent potential wells to store the signal charge corresponding to each of the different color filter elements in each of the wells;
   (b) means for mixing the signal charges stored in two different potential wells and producing a color signal by reading out the mixed signal charges; and
   (c) a color filter provided on the front face of the signal charge storing means and having a portions each portion having a relatively small light transmittance so as to reduce light incident on some of wells to a degree insufficient to completely shield the light.

* * * * *

UNITED STATES PATENT AND TRADEMARK OFFICE
CERTIFICATE OF CORRECTION

PATENT NO. : 4,517,588

DATED : May 14, 1985

INVENTOR(S) : Tetsuro Kuwayama, et al.

It is certified that error appears in the above-identified patent and that said Letters Patent is hereby corrected as shown below:

Column 1, line 12, change "imagers" to -- images --.

Signed and Sealed this

Twentieth Day of May 1986

[SEAL]

Attest:

Attesting Officer

DONALD J. QUIGG

Commissioner of Patents and Trademarks